Dec. 9, 1958 W. O. MORAN 2,863,442
VERTICAL FURNACE WITH POSITIVE DRAFT CONTROLLER
Original Filed Nov. 5, 1954 2 Sheets-Sheet 1
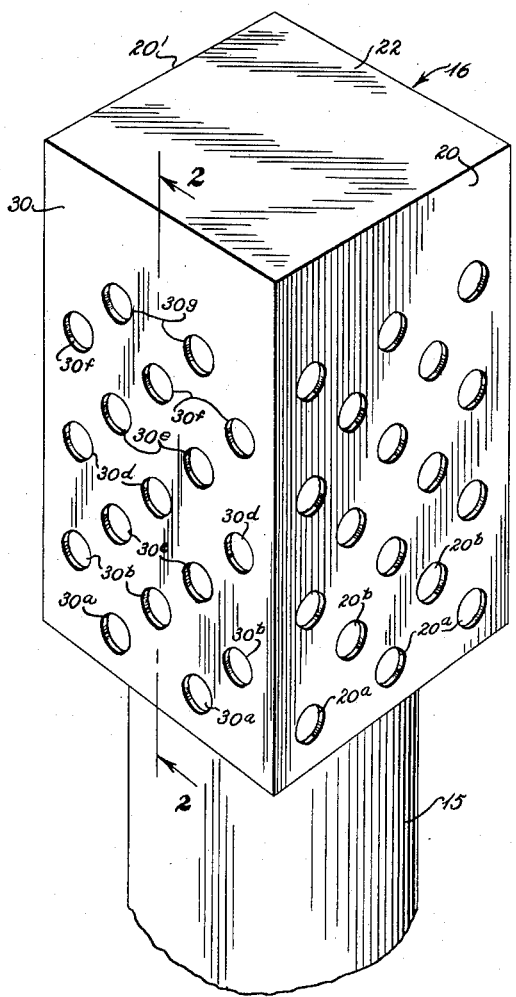
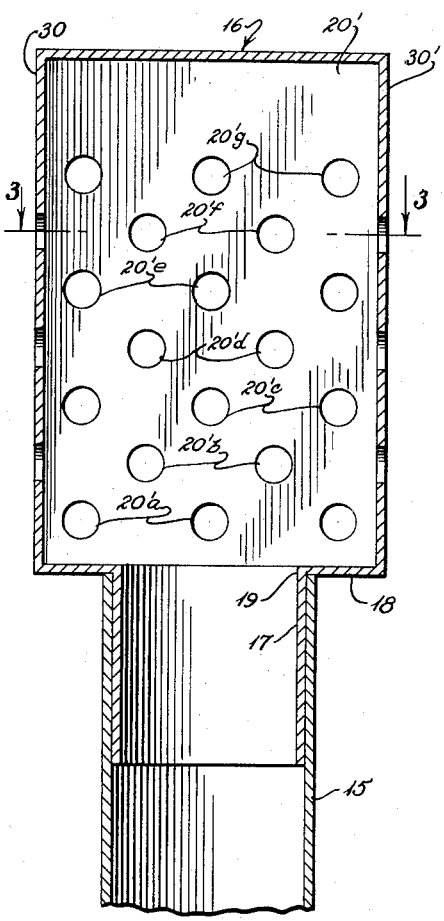
INVENTOR
*William O. Moran*
BY *Beale and Jones*
ATTORNEYS

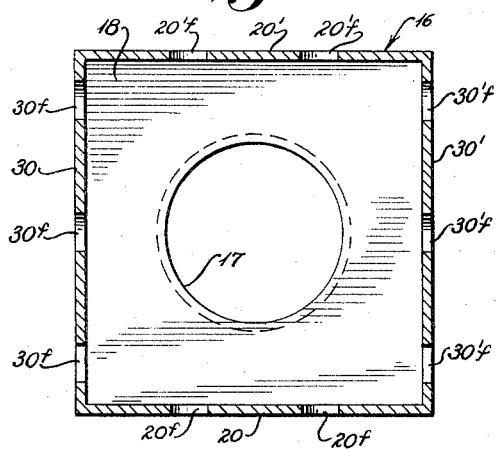
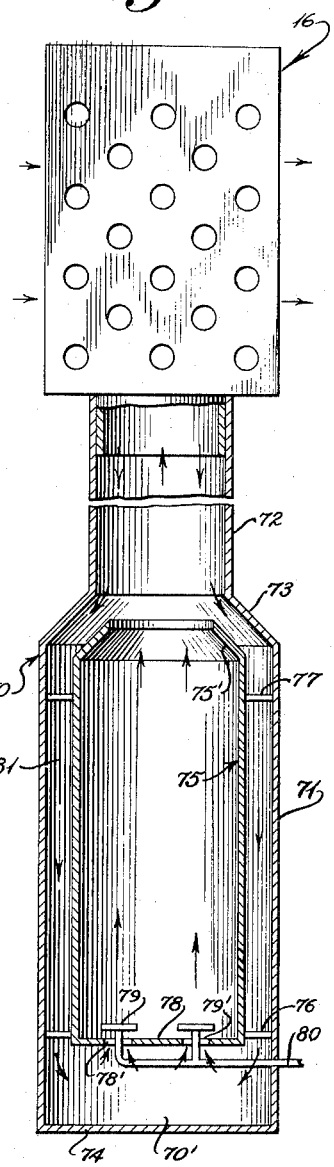

United States Patent Office 2,863,442
Patented Dec. 9, 1958

2,863,442

VERTICAL FURNACE WITH POSITIVE DRAFT CONTROLLER

William O. Moran, Tulsa, Okla.

Original application November 5, 1954, Serial No. 468,852, now Patent No. 2,811,095, dated October 29, 1957. Divided and this application March 20, 1957, Serial No. 650,809

2 Claims. (Cl. 126—85)

My invention is directed to a draft controller to assure a positive draft into a conduit or housing regardless of direct or relative wind conditions acting on the outside of the draft controller. This application is a continuation-in-part application of my copending application Serial Number 313,568, filed October 7, 1952 now U. S. Patent 2,701,999, issued February 15, 1955, and a division of my copending application Serial No. 468,852, filed November 5, 1954, now U. S. Patent 2,811,095.

It is an object of my invention to provide a positive draft in a conduit or housing exposed to the outside atmosphere regardless of outside direct or relative wind conditions.

A still further object of my invention is to provide a positive draft to a chamber through a vertical conduit in communication therewith and through the same conduit introduce and pass exhaust gases leading from the chamber to provide a positive draft through the chamber.

A still further object of my invention is to provide a positive draft to a vertical furnace wherein the bottom end is closed off and air for combustion flows downward while exhaust gases move upward through the vertical furnace.

Another object of my invention is to provide a vertically disposed furnace having a tubular outer casing closed at the bottom, a tubular liner disposed within and in spaced relation with the outer casing and its bottom and forming an elongated annular combustion air supply passage with the outer casing, the liner extending vertically a substantial portion of the outer casing height, a burner assembly at the base of the liner in spaced relation to the closed bottom and an air inlet and exhaust controller at the top of said outer casing and wherein the controller at the top of the outer casing permits free flow of air therethrough to supply a minimum to maximum air draft demand in said furnace regardless of outside wind conditions and free flow of exhaust gases from said burner assembly that pass up through said liner regardless of outside wind conditions.

A still further object of my invention is to provide a positive draft control for a furnace firebox wherein the furnace firebox has an enclosed housing in communication with its air induction opening and said housing has a reserve air induction chamber positioned below the induction opening to afford combustion air for quick lighting of the furnace and a housing head is in communication with said enclosed housing, said housing head breaking up the air currents passing into the housing head so that a uniform amount of air enters the furnace firebox.

Still further objects and the entire scope of applicability of the present invention will become apparent from the detailed description given hereinafter; it should be understood, however, that the detailed description and specific examples are given by way of illustration only and, while indicating preferred embodiments of the invention, are not given by way of limitation, since various changes and modifications within the spirit and scope of the invention will become apparent to those skilled in the art from this detailed description.

For a more complete understanding of the nature and scope of my invention, reference may be had to the following detailed description taken in connection with the accompanying drawing in which;

Fig. 1 is a perspective view of a housing head mounted on the end of an air intake housing which is shown broken off at its lower end;

Fig. 2 is a vertical cross sectional view of the housing and housing head along line 2—2 of Fig. 3 but on a slightly different scale;

Fig. 3 is a horizontal cross sectional view of the housing head along line 3—3 of Fig. 2; and Fig. 4 is a partial vertical cross sectional view of a type of vertical furnace which is closed at the bottom and is surmounted at its top by a positive draft head of the type shown in Fig. 1.

Throughout the description like reference numerals refer to similar parts.

In Figures 1, 2 and 3 there is shown an air intake housing head or positive draft head 16 as mounted on the furnace shown in Fig. 4. This housing head is like that disclosed and claimed in my parent application, now U. S. Patent 2,811,095, issued October 29, 1957, of which this present application is a division. Air intake housing 15 in the form shown is a cylindrical pipe and corresponds with the upper or vertically extending tubular casing 72 shown in Fig. 4. The air intake housing head 16 mounted on the upper end of the air intake housing 15 has a cylindrical thimble 17 at its base which is received in the upper end of the air intake housing 15 and a bottom transverse plate 18 attached to the upper end of thimble 17 and having an aperture 19 therein permitting direct communication between thimble 17 and the housing head proper to be described. The housing head proper is polygonal in shape with four vertically extending sides 20, 20', 30 and 30' attached to the outer edges of transverse bottom plate 18 and extending vertically therefrom and a transverse cover plate 22 attached to the upper edges of the sides 20, 20', 30 and 30'. In the form shown there are seven vertically spaced horizontal rows of ten apertures each. The bottom row, for example, is shown with three spaced apertures 20a in side 20, three spaced apertures 20'a in side 20' oppositely positioned to apertures 20a, two spaced apertures 30a in side 30 and two oppositely positioned apertures 30'a in side 30'. The second horizontal row of apertures from the bottom has two spaced apertures 20b in side 20, two oppositely spaced apertures 20'b in side 20', three spaced apertures 30b in side 30, and three oppositely spaced apertures 30'b in side 30'. The third, fifth and seventh rows from the bottom end are similarly arranged to the bottom row while the fourth and sixth rows of apertures from the bottom end are similarly arranged to the second row of apertures described above.

The apertures are of uniform shape and size, and while shown as round, they may have other shapes. The total area of the apertures is such as to permit free flow of air through the head and the air inlet housing and chamber to which the head is attached.

In carrying out my invention the air flow against the outside of the head 16 is broken up so that differently directed streams of air are caused to flow in the head and on into the air intake housing connected therewith. This break up of the air into streams by the head is thought to take place as a result of providing the apertured and planar sides which in part make up the polygonal shaped elongated tubular head.

No matter what the force or direction of the outside wind conditions may be that are acting on the air intake or positive draft control head 16, there will be a uniform flow or air from the head to the air intake housing connected therewith and to the chamber to which the air intake housing is connected. The polygonal shaped head with its apertured sides is thought to break up the air flow and induce a uniform flow of air from the head to the chamber to which it may be connected to supply the designed demands of the equipment in which the chamber is located and with which the head is connected. With the polygonal shaped tubular body portion of the head a break up of the air currents takes place to supply the burner, for example, in the furnace firebox. At the same time, any increase of wind force or direction acting outside on the head will not affect this uniform flow of supply air from the head to the chamber to which it is attached. It is thought that some of the balancing effects of the wind pressure on the upwind side of the head, as explained more fully in my copending application Serial No. 313,568, filed October 7, 1952, now U. S. Patent 2,701,999, issued February 15, 1955, together with the vacuum created on the downwind side of the head also occurs with this positive draft control head. However, with the positive draft control head some of the wind currents are diverted by the head construction so that a positive draft is supplied to the air intake housing and the chamber to which the head may be attached.

There is maintained within the draft controller or housing head 16 a still-day condition even though wind blows against the outside of the apertured planar sides. Thus, the atmospheric pressure within the head and the conduits and compartments connected therewith is at normal atmospheric pressure. By being able to maintain this normal atmospheric pressure condition regardless of outside wind conditions, a set condition can be maintained in the furnace firebox where the fire may be adjusted or brought up to a maximum efficiency as for a still-day condition. Even though the fire is automatically turned on and off for a maximum and minimum demand, the still-day conditions are maintained while outside conditions fluctuate.

In Fig. 4 furnace is generally indicated at 70 and is built with a vertical tubular base portion 71 which is connected at its top with a small vertically extending tubular casing 72 by the annular throat 73. The bottom end of the furnace is closed off by an integral transverse bottom plate 74. Concentrically within the tubular portion 71 is a tubular liner generally indicated at 75 which is supported in spaced relation in a concentric position from the tubular outer casing 71 by transverse apertured webs 76 and 77 toward the bottom and top respectively. The bottom end of the liner 75 has an apertured bottom plate 78 through which the burners 79 extend that are fed by a fuel line 80. The burner stems 79' extend through enlarged apertures 78' in plate 78 and these enlarged apertures form passages for combustion air to the burners. The upper end of liner 75 has mounted thereon a converging collar 75' through which exhaust gases from the burners 79 pass into the tubular casing 72 and out through a positive draft head 16 mounted on the top of casing 72.

Positive draft head 16 as shown in Fig. 4 is like that as shown in Figures 1 and 2. Combustion air enters through this positive draft head 16 and passes downwardly through the casing 72 and through the annular elongated passage generally indicated at 81 formed between the concentric liner 75 within the casing 71. Furnace 70 has a reserve air chamber at 70' below the burner assembly.

In the operation of furnace 70, assuming that the wind is blowing from the left of the head 16 and striking its planar side, some air will pass through the aligned apertures in the head from one side to the opposite, some air to support combustion in the furnace will enter through lower apertures in the head, travel downward from within head 16, through casing 72 as indicated by the downwardly directed arrows, down through the annular chamber 81 outside of liner 75 and up through the reserve air chamber 70' at the bottom of the furnace and through apertures 78' to the burners 79. The gases of combustion from the burners 79 pass upwardly in the combustion chamber in liner 75, out through casing 72 and to head 16 and out upper apertures of head 16 and particularly on the downward side of the head.

While I have illustrated my positive draft head or air inlet head 16 as being used with a furnace it may equally as well be used wherever a positive draft is required as in pipe chambers carrying pipes giving off heat, engine room stacks and other compartments that are to be ventilated. With the positive draft head, closed bottom end furnaces are made operable since exchange of air for combustion and exhaust gases is enhanced through the same tubular casing.

I claim as my invention:

1. A vertically disposed furnace having a vertically extending tubular outer casing closed at the bottom, a tubular liner disposed within said outer casing in spaced relation therewith and forming an elongated annular combustion air supply passage with said outer casing, a burner assembly in spaced relation to the bottom of said furnace and in communication with said elongated annular air supply passage, a tubular stack attached to said outer tubular furnace casing and a positive draft controller attached to the top of said stack for furnishing a positive draft to and exhausting exhaust gases from said furnace, said positive draft controller having a plurality of interconnected upwardly extending planar sides forming a casing in communication with the top of said tubular stack, an imperforate end attached to and connecting the upper ends of said planar sides, said planar sides having a plurality of uniformly spaced apart rows of spaced apart apertures extending therethrough, said apertures in each of the rows being of uniform size and permitting free flow of air therethrough to supply a minimum to maximum air draft demand in said furnace equivalent to conditions of a still-day existing outside said draft controller regardless of outside wind conditions acting on said planar sides, each row of apertures lying in a common plane normal to said planar sides, some of said apertures in the planar sides also furnishing an exit passage for said exhaust gases from said furnace.

2. A furnace of the character described in claim 1 wherein the bottom of said furnace has a reserve air supply chamber for supplying air to said burners.

References Cited in the file of this patent

UNITED STATES PATENTS

| 636,044 | Humphreys | Oct. 31, 1899 |
| 1,114,394 | Siegler | Oct. 20, 1914 |
| 2,700,419 | Gilmore | Jan. 25, 1955 |
| 2,701,999 | Moran | Feb. 15, 1955 |
| 2,715,400 | Butler | Aug. 16, 1955 |
| 2,764,972 | Ryder | Oct. 2, 1956 |